(12) United States Patent
Adamson et al.

(10) Patent No.: US 8,968,873 B2
(45) Date of Patent: Mar. 3, 2015

(54) CO-FLOW MICROFLUIDIC DEVICE FOR POLYMERSOME FORMATION

(75) Inventors: Douglas H. Adamson, Mansfield Center, CT (US); Michael Stredney, Powhatan, VA (US); Robert K. Prud'homme, Lawrenceville, NJ (US); Mustafa Erhan Yildiz, Whitehouse Station, NJ (US)

(73) Assignees: University of Connecticut, Farmington, CT (US); Princeton University, Princeton, NJ (US)

( * ) Notice: Subject to any disclaimer, the term of this patent is extended or adjusted under 35 U.S.C. 154(b) by 337 days.

(21) Appl. No.: 13/209,183

(22) Filed: Aug. 12, 2011

(65) Prior Publication Data

US 2012/0141796 A1 Jun. 7, 2012

Related U.S. Application Data (60) Provisional application No. 61/373,341, filed on Aug. 13, 2010.

(51) Int. Cl.
*A61K 9/127* (2006.01)
*B05D 3/10* (2006.01)
(Continued)

(52) U.S. Cl.
CPC ........................................ *B01J 13/04* (2013.01)
USPC .......... 428/402.21; 425/5; 427/238; 427/535; 204/450; 204/51; 204/554; 204/601

(58) Field of Classification Search
USPC ................... 428/402–402.24, 403, 404, 407; 427/331, 389.9, 212, 213.3–213.36, 427/483, 256; 516/54; 435/283.1, 6, 4, 183, 435/91.2, 283.2, 286.1, 287.1; 264/534, 5, 264/41, 4–4.7; 424/400, 408, 450, 451, 424/455, 93.7, 184.1, 497, 489, 501, 490, 424/491, 492, 493, 494, 495; 204/451, 453, 204/601, 604, 450

See application file for complete search history.

(56) References Cited

U.S. PATENT DOCUMENTS 6,221,332 B1 4/2001 Thumm et al.
7,151,077 B2 12/2006 Prud'homme et al.
(Continued)

FOREIGN PATENT DOCUMENTS

WO WO 2009/148598 12/2009
WO PCT/US2011/047640 8/2011

OTHER PUBLICATIONS

PCT International Search Report and Written Opinion dated Jan. 5, 2012.
(Continued)

*Primary Examiner* — James J Seidleck
*Assistant Examiner* — S. Camilla Pourbohloul
(74) *Attorney, Agent, or Firm* — McCarter & English, LLP (57) ABSTRACT

A microfluidic device to produce polymersomes having three coaxial passageways of increasing size with fluid flowing in one direction. The first and smallest passageway contains the content of the polymersome, the middle passageway contains a block copolymer, and the largest and outer passageway contains an aqueous medium or water. The device can produce polymersomes with control of size and membrane thickness. The device will allow quantitative loading of the polymersomes in high quantities. The device is robust and easily assembled and has the ability to independently control the three streams involved in making the polymersomes.

13 Claims, 8 Drawing Sheets

(51) Int. Cl.
 C12M 1/36 (2006.01)
 B01J 13/04 (2006.01)

(56) References Cited

U.S. PATENT DOCUMENTS

| | | | |
|---|---|---|---|
| 7,595,195 | B2 | 9/2009 | Lee et al. |
| 2002/0005354 | A1 | 1/2002 | Spence et al. |
| 2006/0051329 | A1 | 3/2006 | Lee et al. |
| 2008/0014589 | A1* | 1/2008 | Link et al. ............ 435/6 |
| 2009/0012187 | A1* | 1/2009 | Chu et al. ............ 516/54 |

OTHER PUBLICATIONS

Zheng, S. et al., Microencapsulation of Hemoglobin in Liposomes Using a Double Emulsion, Film Dehydration/Rehydration Approach, Biochimica et Biophysica Acta, 1196(2), p. 123-130, 1994.
Discher, B.M. et al., Polymersomes: Tough Vesicles Made from Diblock Copolymers, Science, 284, p. 1143-1147, 1999.
Lee JC, et al. Preparation, Stability, and in vitro Performance of Vesicles Made with Diblock Copolymers. Biotechnol Bioeng 73 (2):135-145, (2001).
Discher DE, et al. Polymer Vesicles, Science 297 (5583):967-973, (2002).
Meng, F. et al., Biodegradable Polymersomes, Macromolecules, p. 3004-3006, 2003.
Cramer C, et al. Drop Formation in a Co-Flowing Ambient Fluid, Chemical Engineering Science 59 (15):3045-3058. (2004).
Okushima S, et al. Controlled Production of Monodisperse Double Emulsions by Two-Step Droplet Breakup in Microfluidic Devices. Langmuir 20 (23):9905-9908. doi:10.1021/1a0480336, (2004).
Lorenceau, E. et al., Generation of Polymerosomes from Double-Emulsions, Langmuir, 21, p. 9183-9186, 2005.
Discher DE, et al., Polymersomes, Annu Rev Biomed Eng 8 (1):323-341. doi:10.1146/annurev.bioeng.8.061505.095838, (2006).
Hayward, et al., Dewetting Instability During the Formation of Polymersomes from Block-Copolymer-Stabilized Double Emulsions, Langmuir, 22(10), 4457-4461, 2006.
Chu L-Y, et al., Controllable Monodisperse Multiple Emulsions, Angew Chem Int Ed 46 (47):8970-8974. doi:10.1002/anie.200701358, (2007).
Utada AS, et al., Dripping, Jetting, Drops, and Wetting: The Magic of Microfluidics, Dripping, Jetting, Drops, and Wetting: The Magic of Microfluidics. MRS Bulletin 32:702-708, (2007).
Yildiz, M.E. et al., Formation and Characterization of Plymersomes Made By A Solvent Injection Method, Poly. Adv. Technologies, p. 427-432, 2007.
Li, D. et al., Processable Aqueous Dispersions of Graphene Nanosheets, Nature Nanotechnology, vol. 3, p. 101-105, 2008.
Utada, et al., Absolute Instability of a Liquid Jet in a Coflowing Stream, Physical Review Letters, 100(1), 014502-1—014502-4, 2008.
Shah RK, et al. Designer Emulsions Using Microfluidics, Materials Today 11 (4):18-27. doi:10.1016/S1369-7021(08)70053-1, (2008).
Shum, H.C. et al., Microfluidic Fabrication of Monodisperse Biocompatible and Biodegradable Polymersomes With Controlled Permeability, J. Am. Chem. Soc., 130, p. 9543-9549, 2008.
Teh S-Y, et al. Droplet Microfluidics. Lab Chip 8:198-220. doi:10.1039/b715524g, (2008).
Abate, A.R. et al., Impact of Inlet Channel Geometry on Microfluidic Drop Formation, American Physical Society, 80(2), p. 026310(5), 2009.

Chen C-H, et al., Janus Particles Templated from Double Emulsion Droplets Generated Using Microfluidics. Langmuir 25 (8):4320-4323. doi:10.1021/1a900240y, (2009).
LoPresti C, Lomas H, Massignani M, Smart T, Battaglia G, Polymersomes: Nature Inspired Nanometer Sized Compartments, Journal of Materials Chemistry 19 (22):3576. doi:10.1039/b818869f, (2009).
Liu, L. et al., Microfluidic Preparation of Monodisperse Ethyl Cellulose Hollow Microcapsules With Non-Toxic Solvent, Journal of Colloid and Interface Science, 336, p. 100-106, 2009.
Rameez, S. et al., Large Scale Production of Vesicles by Hollow Fiber Extrusion: A Novel Method for Generating Polymersome Encapsulated Hemoglobin Disperions, Langmuir, 26(7), 5279-5285, 2010.
Baroud CN, et al., Dynamics of Microfluidic Droplets, Lab on a Chip 10:2032-2045. doi: 10.1039/e001191f, (2010).
Brown L, et al. Polymersome Production on a Microfluidic Platform Using pH Sensitive Block Copolymers. Lab on a Chip 10 (15):1922-1928. doi:10.1039/c004036c, (2010).
Borman, S., Dendrimersomes Deput, Supramolecular Chemistry: Self-Assembled Dendrimer-Based Structures Could Deliver Drugs, Other Substances, Chemical & Engineering News, vol. 88, No. 21, p. 7, 2010.
Lee MH, et al., Microfluidic Fabrication of Stable Nanoparticle-Shelled Bubbles. Langmuir 26 (4):2227-2230. doi:10.1021/1a904425v, (2010).
Microfluidics, Nanoencapsulation, 2010, available at http://wvvw.microfluidicscorp.com/index.php?option=com_content&view=article&id=94&Itemid=42.
Thiele, J. et al., Preparation of Monodisperse Block Copolymer Vesicles Via Flow Focusing in Microfluidics, American Chemical Society, DOI: 10.1021/1a904163v, 2010.
Kim S-H, et al., Multiple Polymersomes for Programmed Release of Multiple Components. J Am Chem Soc 133 (38):15165-15171, doi: 10.1021/ja205687k, (2011).
Perro A, et al., Mastering a Double Emulsion in a Simple Co-Flow Microfluidic to Generate Complex Polymersomes. Langmuir 27 (14):9034-9042. doi:10.1021/1a1037102, (2011).
Shum HC, et al., Multicompartment Polymersomes from Double Emulsions. Angew Chem Int Ed 50 (7):16861689. doi:10.1002/ange.201006023, (2011).
Zhao Y, et al., Microfluidic Generation of Multifunctional Quantum Dot Barcode Particles, J Am Chem Soc 133 (23):8790-8793. doi:10.1021/ja200729w, (2011).
Duncanson WJ, et al., Microfluidic Synthesis of Advanced Microparticles for Encapsulation and Controlled Release, Lab on a Chip 12 (12):2135. doi:10.1039/c2lc21164e, (2012).
Kim S-H, et al, Enhanced-Throughput Production of Polymersomes Using a Parallelized Capillary Microfluidic Device, Microfluid Nanofluid 14 (3-4):509-514. doi:10.1007/s10404-012-1069-5, (2012).
Lee JS, et al., Polymersomes for Drug Delivery: Design, Formation and Characterization. Journal of Controlled Release 161 (2):473-483. doi:10.1016/j.jconrel.2011.10.005, (2012).
Marguet M, et al., Polymersomes in "Gelly" Polymersomes: Toward Structural Cell Mimicry. Langmuir 28 (4):2035-2043. doi:10.1021/1a204018w, (2012).
Kim S-H, et al., Polymersomes Containing a Hydrogel Network for High Stability and Controlled Release, Small 9 (1):124-131. doi:10.1002/sm11.201201709, 2013.

* cited by examiner

CO-FLOW MICROFLUIDIC DEVICE FOR POLYMERSOME FORMATION

CROSS REFERENCE TO RELATED APPLICATIONS

This application claims the benefit of U.S. Provisional Application No. 61/373,341, filed Aug. 13, 2010, the entire contents of which is herein incorporated by reference in its entirety.

BACKGROUND

1. Technical Field

The present disclosure generally relates to a microfluidic device, and more particularly to a microfluidic device suitable for encapsulation of pharmaceutical, flavors, fragrances and the like by forming polymersomes and liposomes as encapsulation and delivery agents, viscosity modifiers and/or thickening agents.

2. Background Art

In general, polymersomes represent a class of vesicles, tiny hollow spheres that enclose a solution. Polymersomes are typically made using amphiphilic synthetic block copolymers to form the vesicle membrane, and generally range from about 50 nm to about 5 um in radius or more. Polymersomes generally contain an aqueous medium in their core and are useful for encapsulating and protecting sensitive molecules, such as, for example, drugs, enzymes, other proteins and peptides, and DNA and RNA fragments. In general, the polymersome membrane provides a physical barrier that isolates the encapsulated material from external materials, such as those found in biological systems.

Polymersomes are similar to liposomes, which are formed from naturally occurring lipids. While having many of the properties of natural liposomes, polymersomes typically exhibit increased stability and reduced permeability. Furthermore, the use of synthetic polymers allows manipulation of the characteristics of the membrane and thus control permeability, release rates, stability and other properties of the polymersome.

Encapsulated actives such as fragrances, flavors, pharmaceutical materials, etc., may be used in a variety of cosmetic, pharmaceutical and food related areas. Such applications include, but are not limited to, fragrance, drug and flavor encapsulation using well-defined particle size encapsulation agents. Polymersomes containing active enzymes that provide a way to selectively transport substrates for conversion have been described as nanoreactors and have been used to create controlled release drug delivery systems while being substantially invisible to the immune system.

There are various methods to protect active compounds from environmental and processing conditions, avoid loss of volatiles and release actives at desired times. Active encapsulation generally requires using a carrier material for protection, delivery and controlled release. Liposomes and polymersomes can be used as active delivery agents. Successful encapsulation processes require high encapsulation efficiency, protection of actives from unfavorable process and storage conditions and favorable release mechanisms.

Liposomes are used in various cosmetics applications such as cosmetic stick formulations and anhydrous spray formulations. Liposome encapsulated actives are generally spray dried with other hydrocolloids and dispersed in various formulations. Successful encapsulation in the fragrance industry, for example, for hair care products, depends on factors such as availability, cost and compatibility of ingredients and deposition of the actives onto hair. The active should survive washing, rinsing and even drying of hair. Even though liposomes have been used extensively for delivery and deposition of actives onto the hair, they may have limitations in terms of shelf life and after administration. However, polymersomes or nanoparticles of lipids/polymers may overcome some limitations experienced with liposomes. In general, polymersomes are tougher and stronger than liposomes. The ability to modify the surface of liposomes and polymersomes with anchoring molecules may enhance the survival of actives during various stages of use.

Encapsulation of flavors has enjoyed numerous available techniques. Spray drying and extrusion are some common encapsulation techniques. These processes generally require high temperature exposure, and heat and/or oxygen sensitive flavors are adversely affected from these methods. Other techniques are freeze drying and hot melting. Liposomes are also used as flavor encapsulation agents.

Encapsulation of physiologically active compounds can enhance bioavailability and therapeutic index over extended time scales. Lipid and polymer based drug delivery systems utilize the ability to form micro-spheres. These micron size particles can be used for a variety of purposes ranging from direct injection to aerosols for inhalation. Unilamellar and multilamellar liposomes have also been used as lipid-based drug delivery systems.

Currently, polymersomes are made nearly exclusively by a process of film rehydration. The method involves simply the spontaneous budding off of polymersomes from a polymer surface. It is a slow process and with very low levels of material encapsulation. This process provides little control of polymersome size or membrane thickness and loading is inefficient. It is believed that polymersomes are currently not used commercially due to these problems.

One known device is used to make polymersomes by microfluidics using opposing fluid flows. The device is tedious to produce with a high failure rate. It is fragile, and has not been shown to allow control of size or membrane thickness of the polymersomes produced.

In view of the various known beneficial uses of polymersomes as useful carriers for targeted medication and the lack of suitable ways to prepare them, it is desirable to provide an improved apparatus to prepare polymersomes and its method of its use. These and other inefficiencies and opportunities for improvement are addressed and/or overcome by the systems and methods of the present disclosure.

SUMMARY

Generally speaking, in accordance with exemplary embodiments of the present disclosure, a substantially rigid block with three concentric holes of increasing size into which are placed three tubes or capillaries is provided. The innermost capillary has an opening of from between about 100 to about 500 nanometers to about 10 to 100's of microns produced by a capillary puller and includes the active ingredient in an aqueous medium. The second, or middle, capillary has a somewhat larger opening and surrounds a portion of the inner capillary and provides a polymer for forming the polymersome. A third larger capillary surrounds the other two providing an aqueous medium. The scaffold of the device is a small polymer block chosen for its chemical compatibility and machinability. In exemplary embodiments of the present disclosure, the capillaries are all held in position by insertion into the block.

Fluid is introduced to each tube in the same direction. A Teflon tube is directly connected to the inner capillary that introduces the active ingredient in an aqueous medium and is directly connected to the glass outlet tube of the device. Fluid including the polymer is introduced in the middle tube, and water or an aqueous medium is introduced into the outer capillary by way of channels cut into the device block perpendicular to the capillaries and at the end of each drill hole. Fluid flow rates are controlled to provide laminar flow.

The present disclosure provides for a device for the preparation of polymersomes.

The present disclosure also provides for a device for preparation of polymersomes and for controlling the size of the polymersomes prepared.

The present disclosure also provides for a device to prepare polymersomes that allows loading of material inside the polymersomes with near 100% efficiency.

The present disclosure also provides for a device to prepare polymersomes that allows control of the composition of the bilayer that defines the polymersome.

The present disclosure also provides for a device to prepare polymersomes having multiple bilayers resulting in a thicker "skin" and a more robust polymersome.

The present disclosure also provides for a device that allows for much faster production of polymersomes.

The present disclosure also provides for a method for producing polymersomes.

Exemplary embodiments of the present disclosure accordingly includes a product possessing the features, properties, and the relation of components and the several steps and the relation of one or more of each steps with re-respect to each of the others which will be exemplified in the product hereinafter described, and the scope of the present disclosure will be indicated in the claims.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

In the description which follows, like parts are marked throughout the specification and drawings with the same reference numerals, respectively. Drawing figures are not necessarily to scale and in certain views, parts may have been exaggerated for purposes of clarity.

Figure 8:
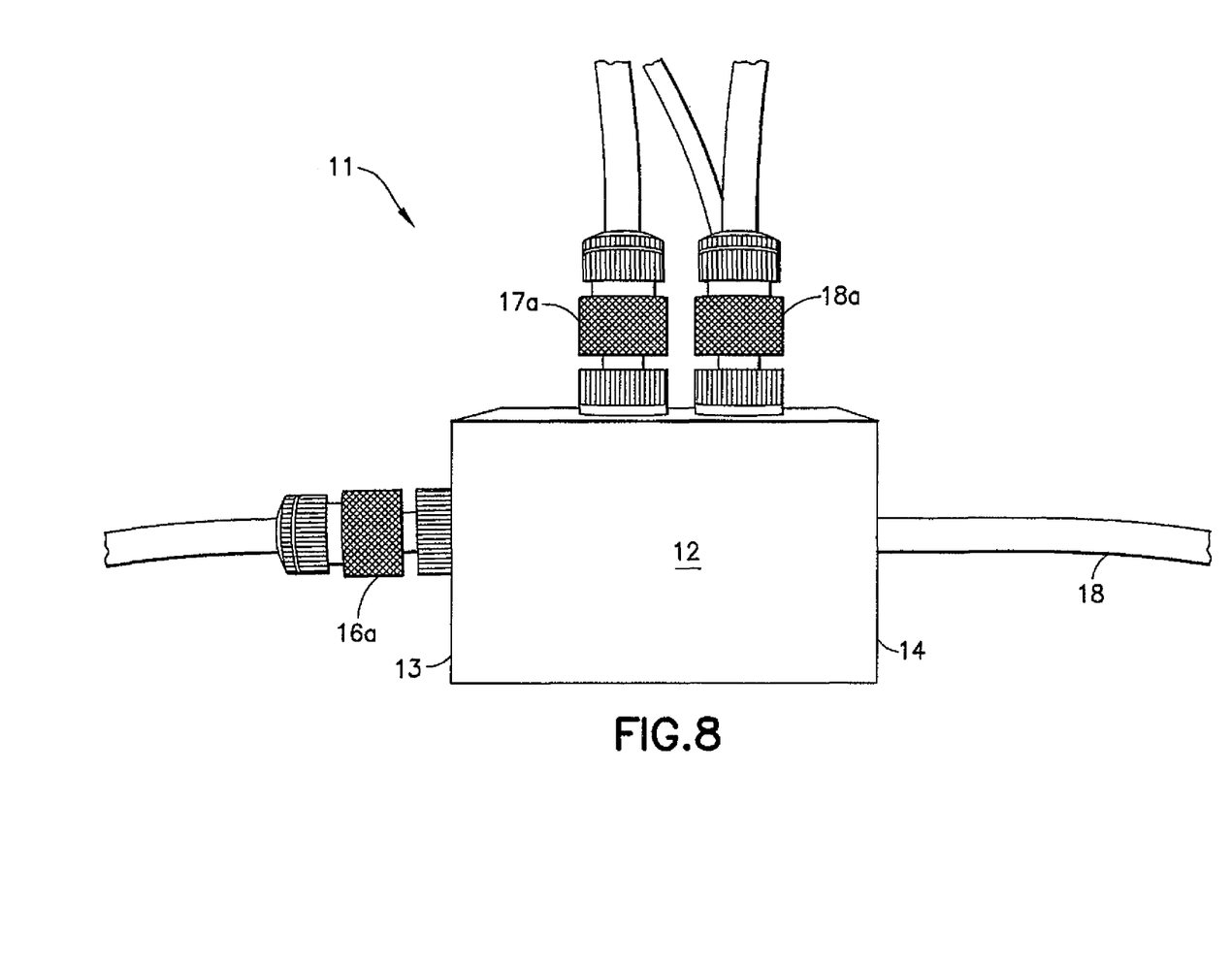
FIG. 8 is a side elevational view of a concentric capillary microfluidic device constructed and arranged in accordance with an embodiment of the present disclosure.

A unitary flow direction microfluidic device 11 constructed and arranged in accordance with an exemplary embodiment of the present disclosure is shown in elevation in FIG. 8. In general, device 11 is formed of a substantially rigid block or housing 12 having an input end 13 and an output end 14 that has been machined to include three concentric tubes. These tubes are shown in the schematic views of FIGS. 1-3. Here, an innermost tube 16 is referred to as tube #1, a middle tube 17 is referred to as tube #2, and an outer tube 18 is referred to as tube #3. In exemplary embodiments, each tube 16, 17 and 18 is separately fed by a syringe pump or the like.

Figures 1, 2, 3:
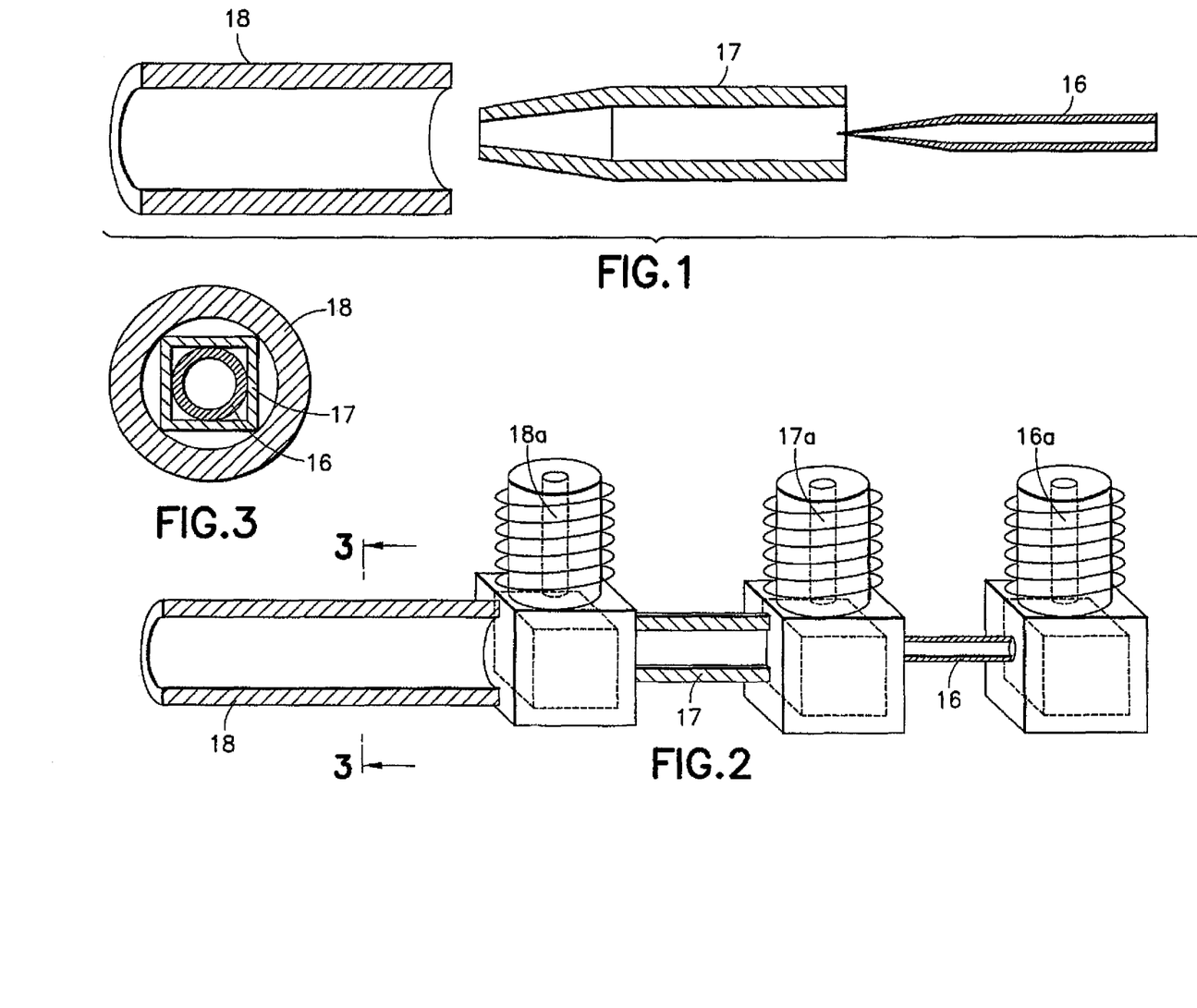
FIG. 1 is a schematic view in section of a unitary flow direction concentric capillary microfluidic device constructed and arranged in accordance with an exemplary embodiment of the present disclosure.
FIG. 2 is a schematic view in section of the concentric capillary microfluidic device of FIG. 1 showing the fluid inlets.
FIG. 3 is a schematic view in section of the concentric capillary microfluidic device of FIG. 2 taken along line 3-3.

In the construction illustrated in FIGS. 1-3, smallest tube 16 (tube #1) contains an aqueous medium containing any material that will be loaded into a polymersome. Middle tube 17 (tube #2) contains a block copolymer dissolved in a non-selective solvent. Largest tube 18 (tube #3) contains an aqueous solution which may be pure water or may be a solution formulated to control the osmotic pressure mismatch between the inside and the outside of the polymersome. Fluid is introduced into the inlet end of each tube by a fitting 16a, 17a and 18a as shown in FIG. 2. Fittings 16a, 17a and 18a may be luer locks for connecting Teflon tubes to tube 16, 17 and 18.

In exemplary embodiments, tubes 16, 17 and 18 are kept concentric and kept from touching each other by block 12 in which they are held. Device 11 is generally formed by drilling three holes. First, smallest hole 21 is drilled through the entire length of block 12. A middle size hole 22 is drilled roughly two thirds of the way through block 12. Finally, a hole 23, the largest hole, is drilled to roughly one third the length of block 12. Holes 21, 22 and 23 are concentric and their size closely matches the outside diameters of tubes 16, 17 and 18, respectively and mentioned previously.

In general, block 12 is ultra-high molecular weight polyethylene, chosen due to its high degree of chemical compatibility and machinability, although the present disclosure is not limited thereto. Other types of blocks (e.g., polymer blocks) are suitable, for example, the materials of construction of which may include a wide variety of materials. For example, these include non-ferrous metals, silica-based materials, carbonaceous materials, polymeric materials, such as nylon, polyacetals, polyvinylchloride, polyethylene, polypropylene and fluorine containing polymers, such as polytetrafluoroethylene (PTFE), perfluoroalkoxy (PFA), or other suitable plastic material. The polymeric materials may be filled or unfilled, so long as it is chemically compatible.

Figure 9:
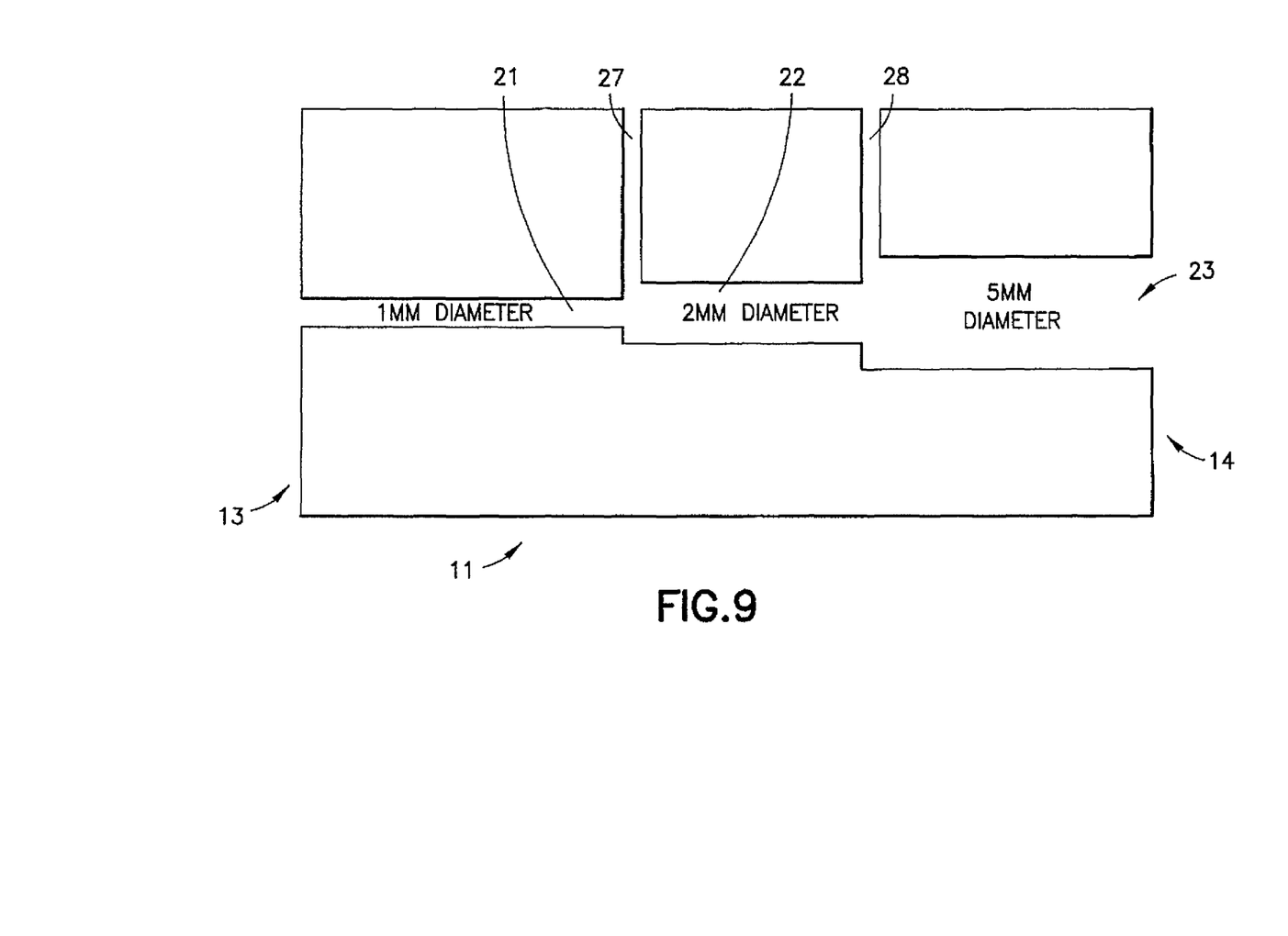
FIG. 9 is a schematic view showing the concentric holes and channels drilled into a rigid block to prepare the microfluidic device in accordance with an exemplary embodiment of the present disclosure.
Figure 10:
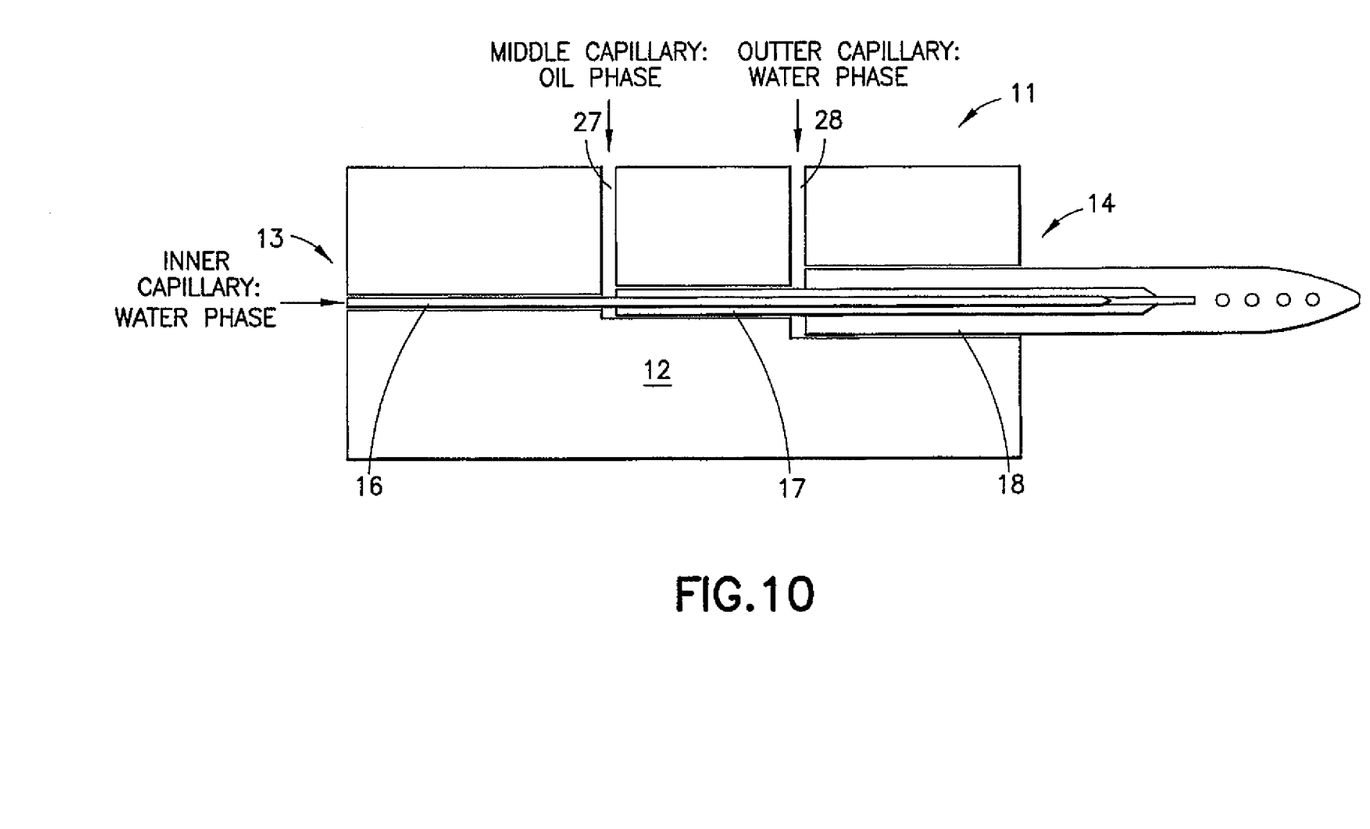
FIG. 10 is a schematic view showing the concentric capillaries placed in the holes drilled into the block of FIG. 9 to prepare the microfluidic device in accordance with the present disclosure.

In order to construct device 11, smallest tube 16 (tube #1) is typically inserted substantially all the way through block 12 by way of first hole 21. Middle tube 17 (tube #2) is inserted over smallest tube 16 and is pushed into block 12 just short of the end of second drilled hole 22. Largest tube 18 (tube #3) is then inserted to just short of the end of the third and largest diameter drilled hole 23. FIG. 3 shows this schematically as, does FIG. 9.

In exemplary embodiments of the present disclosure, the dimension of smallest hole 21 is typically about 1 mm in diameter but can be smaller or larger and range from about 0.1 mm to about 2 mm, but preferable is between about 0.5 and about 1.5 mm. A size is selected to facilitate insertion of tube 16 that may have an internal diameter of about 10 to about 500 µm that is tapered to about 5 to about 50 µm at the outlet. Middle hole 22 is larger than smallest hole 21 and drilled to about 2 mm in diameter, but may range from about 1.5 to about 3.0 mm to accommodate middle tube 17 having an inner diameter from about 40 to about 1000 µm. Outer hole 23 is about 5 mm in diameter, but may range from about 3 to about 6 mm for receiving outer tube 18 having an inner diameter of from about 1000 to about 4000 µm for transporting the outer water or fluid phase and receiving the polymersomes at outlet side 14 of block 12.

With reference now to FIG. 8, fluid is introduced directly into each tube 16, 17 and 18. For smallest tube 16, a Teflon tube or the like from a pump, preferably a small pump, such as a syringe pump, an HPLC pump, or a small infusion pump is connected (e.g., directly connected) by a leur lock 16a to tube 16 that is generally glass at input side 13 of block 12. For middle tube 17 and largest tube 18, fluid is introduced by way of a pair of channels 27 and 28, respectively, cut into block 12 substantially perpendicular to tubes 16, 17 and 18 at the end of each drill hole 22 and 23. Block 12 is tapped and leur locks 17a and 18a are screwed into block 12 to attach Teflon tubes. Fluid then enters tubes 16, 17 and 18 through the ends of each tube inserted into block 12. Flow rates are controlled to insure laminar flow of all fluids.

The formation of polymersomes occurs by surrounding drops formed from smallest tube 16 with the polymer solution of middle tube 17. The resulting droplets surrounded by polymer solution is carried along by the flow from largest tube 18. During this time, the solvent surrounding the droplet from smallest tube 16 diffuses into the bulk aqueous solution, leaving the block copolymers behind. As these copolymers consist of a hydrophobic and a hydrophilic block or layer, the polymer self-assembles into a bilayer. That is, the hydrophilic block or layer faces the aqueous phase both inside and outside of the polymersome, while the hydrophobic blocks are buried in the core of the polymer layer. The result is a thin skin of outer polymer defining a sphere or sphere-like shape or layer. Conceptually this is much like a balloon. The inner solution is separated from the outer solution by the block copolymer bilayer.

The following examples are set forth for purposes of illustration only, and not intended to be presented in a limiting sense. In each case a block 12 including three concentric tubes as described above in connection with FIG. 8 is used. Inner tube or capillary 16 is designated Q1, middle tube 17 is designated Q2 and outer tube 18 is designated Q3. The diameters of the tubes or capillaries were Q1=1 mm with the tip being drawn down to approximately 50 microns, Q2=2 mm, and Q3=5 mm.

Example 1

The flow rates to the capillaries are Q1=0.2 ml/min, Q2=0.4 ml/min, and Q3=3.3 ml/min. The inner fluid (Q1) was water, the middle fluid (Q2) was a solution of chloroform and dioxane in a 17:3 v/v ratio containing 3 mg/ml of PA60-30 (a poly(butadiene-b-acrylic acid) block copolymer of 30 K molecular weight containing 30 wt % of the hydrophilic poly(acrylic acid) block). The outer flow Q3 contained water.

These parameters resulted in drop sizes of approximately 100 microns.

Example 2

The fluids are the same as in Example 1, with Q1=water, Q2=block copolymer solution of chloroform and dioxane, and Q3=water. Tubes or capillaries are the same size as in Example 1 but the flow rate for Q2 is increased. The flow rates were Q1=0.2 ml/min, Q2=0.5 ml/min and Q3=3.3 ml/min.

The resulting drops produced are approximately 80 microns in size.

Figure 4:
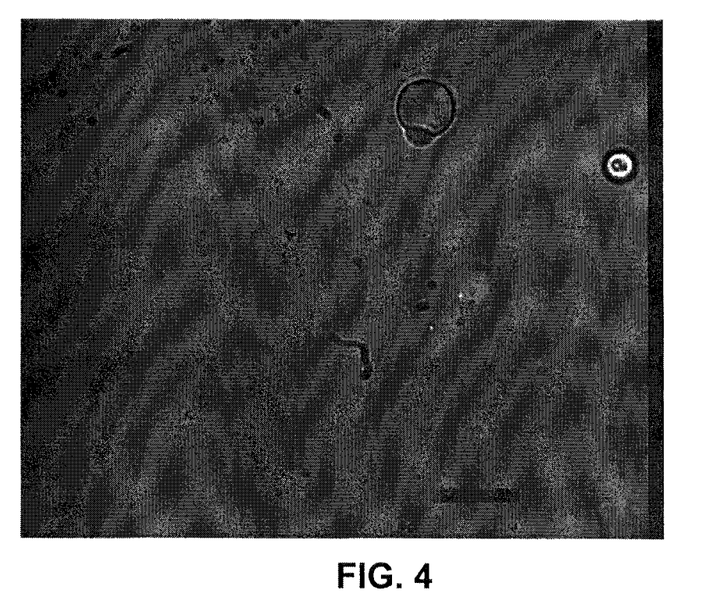
FIG. 4 is a light microscopy image of polymer stabilized vesicular structures filled with fluorescein added to internal deionized water flow made in the microfluidic device of FIGS. 1-3.
Figure 5:
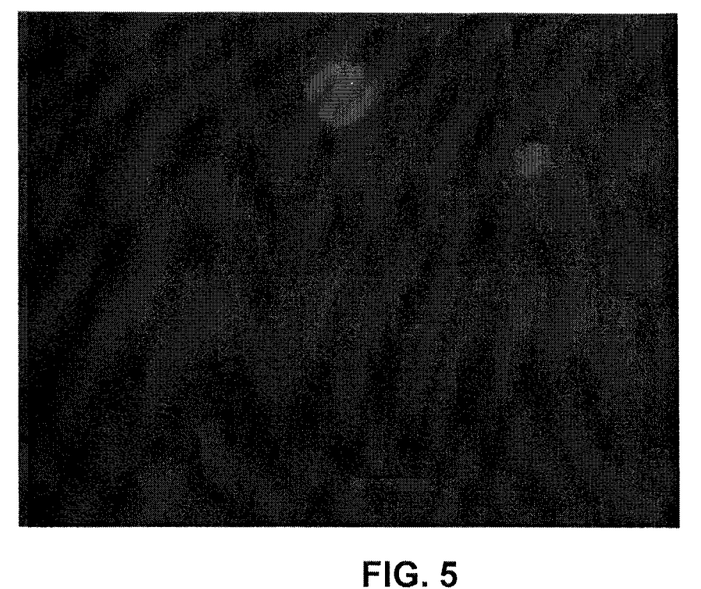
FIG. 5 is a fluorescent microscopy image of the polymer stabilized vesicular structures of FIG. 4.
Figure 6:
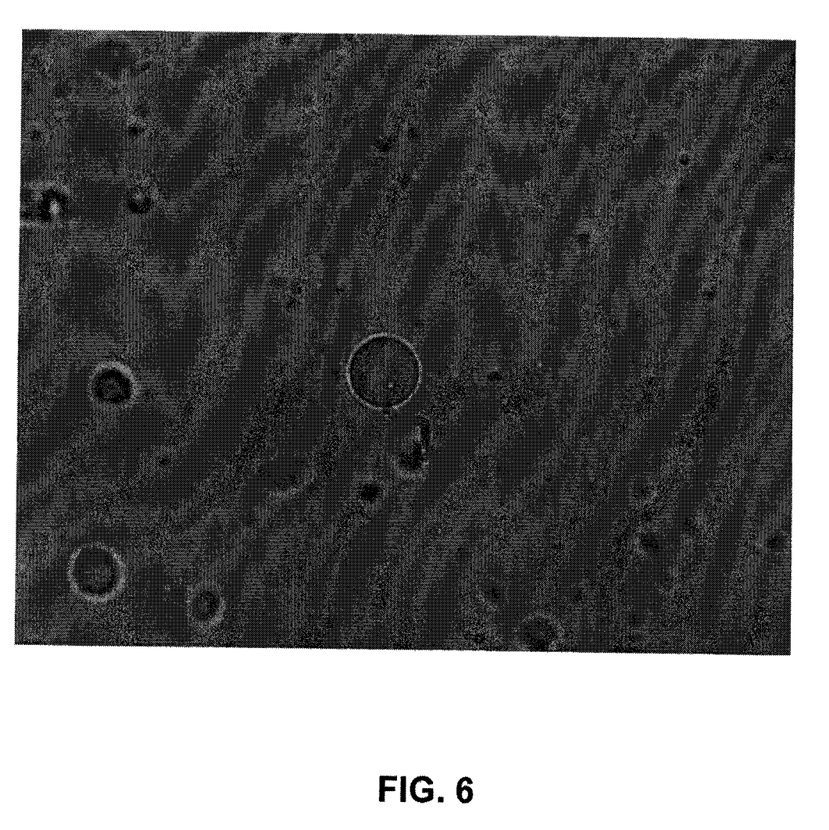
FIG. 6 is an electron microscopy image of a polymersome prepared in a device of FIGS. 1-3.
Figure 7:
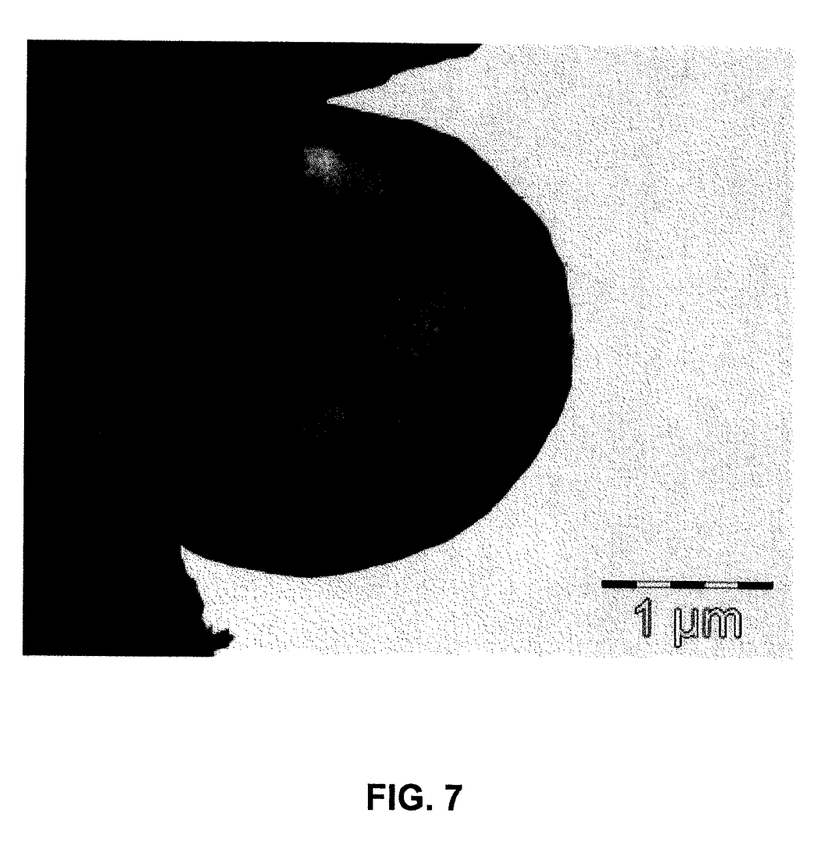
FIG. 7 is a transmission electron microscopy image of a $OsO_4$ stained/fixed polymersome captured on a copper TEM grid prepared in a device of FIGS. 1-3.

Examples of polymersomes made utilizing exemplary device 11 are shown in FIGS. 4-7 and 11. FIGS. 4 and 5, respectively are light and fluorescent microscopy images of polymer stabilized vesicular structures filled with fluorescein added to internal deionized water flow made by microfluidic device 11. FIG. 6 is a microscopy image of a solution that includes polymersomes in accordance with an embodiment of the present disclosure. The scale bars in FIGS. 4-6 are 10 µm. FIG. 7 is a transmission electron microscopy image of a $OsO_4$ stained/fixed polymersome captured on a copper TEM grid.

Figure 11:
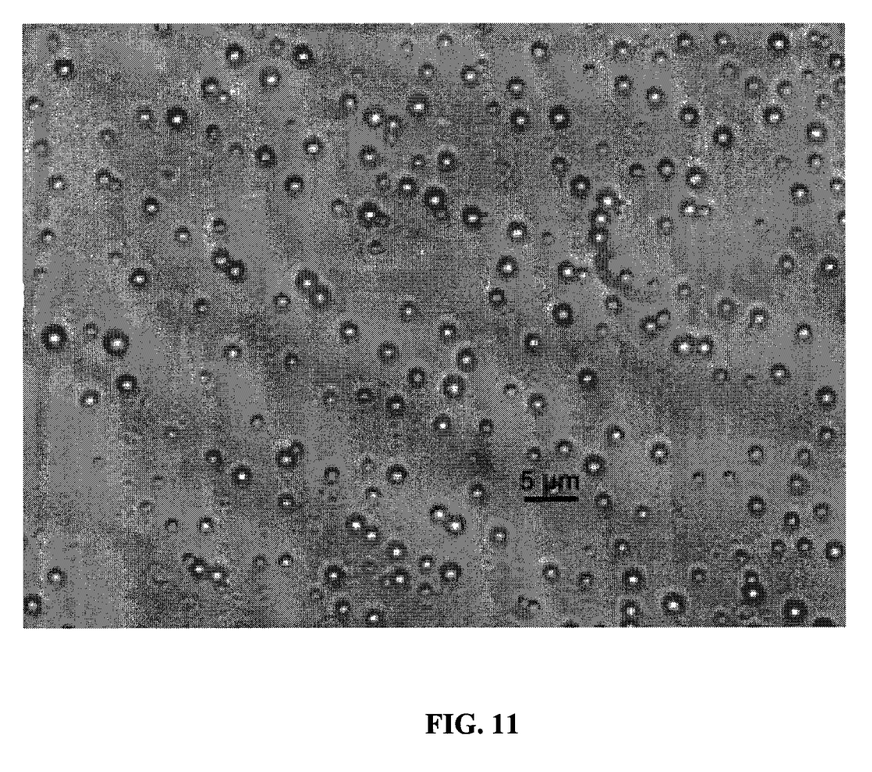
FIG. 11 is a light microscopy image showing the formation of polymersomes according to an exemplary embodiment of the present disclosure.

FIG. 11 is a light microscopy image showing the formation of polymersomes according to another exemplary embodiment of the present disclosure. The polymer used was Pluronics 127, a commercially available amphiphilic block copolymer. The organic solvent used to dissolve the polymer was a mixture of toluene and chloroform, which is removed by dialysis. The relative flow rates of the tubes/capillaries were 0.35 ml/minute for the inner flow (Q1), 1.00 ml/minute for the middle flow (Q2), and 5.00 ml/minute for the outer flow (Q3). The initial droplet formation was in the jetting regime. As shown in FIG. 11, the polymersomes are about a micron in diameter. It is noted that the size distribution largely comes from the issue of focusing (i.e., the polymersomes shown are not all in the same plane, so some polymersomes are focused on the center while others are focused near the top or bottom, so they appear smaller).

A wide variety of active ingredients can be included in the inner phases as set forth in WO/2009/148598, the entire contents of which is incorporated herein by reference in its entirety. Examples of block copolymers including a hydrophobic block and a hydrophilic block suitable for use in preparing polymersomes in accordance with the present disclosure are described in WO/2009/148598 and U.S. Pat. No. 7,151,077, the entire contents of which U.S. patent is also incorporated herein by reference in its entirety.

A microfluidic device prepared in accordance with the present disclosure is capable of producing monodisperse polymersomes in a highly controlled manner. The device is highly robust, portable, and contains very few components that are all very easy and convenient to change. The scaffold of the device is a small block chosen due to its high degree of chemical compatibility and machinability. The polymer block is designed in such a way that three capillaries are held in place while being individually supplied with fluid from a pump (e.g., syringe pump). This allows for independent control of each fluid stream and control of polymersome size, membrane thickness, and quantitative encapsulation. Each of the channels has a luer lock or the like attached to it, to which a tube is attached that connects each to the syringe and syringe pump that supplies the fluid. The use of this system greatly increases versatility, where parts can be quickly and easily interchanged, and fluid flow rates can be easily tailored independent of each other.

The advantages of preparing polymersomes by this technique over traditional film rehydration techniques include:
1. The ability to control the size of the polymersomes.
2. Loading of material inside the polymersomes with near 100% efficiency.
3. Ability to control the composition of the bilayer that defines the polymersome.
4. Allows for much faster production of polymersomes.
5. Allows for increasing the number of bilayers defining each polymersome, thus enabling the tailoring of the robustness of the polymersomes.

While the present disclosure has been described with reference to certain preferred embodiments, numerous changes, alterations and modifications to the described embodiments are possible without departing from the spirit and scope of the present disclosure as defined in the appended claims, and equivalents thereof.

It will thus be seen that the objects set forth above, among those made apparent from the preceding description, are efficiently attained and, since certain changes may be made in the above method product without departing from the spirit and scope of the present disclosure, it is intended that all matter contained in the above description and shown in the accompanying drawings shall be interpreted as illustrative and not in a limiting sense.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A microfluidic device for preparing encapsulation agents, comprising:
    a substantially rigid, continuous housing having an inlet side with an inlet opening and outlet side with an outlet opening and at least three concentric and coaxial tubes in the housing, the housing having: (i) a first hole extending from the inlet opening to a first position within the housing, (ii) a second hole extending from the first position within the housing to a second position within the housing, the second hole larger than the first hole and concentric to the first hole, and (iii) a third hole extending from the second position within the housing to the outlet opening, the third hole larger than the second hole and concentric to the first and second holes;
    an inner tube passing through the housing from the inlet side to the outlet side, at least a portion of the inner tube positioned within the first, second and third holes;
    a middle tube having a diameter greater than the inner tube positioned within the housing extending from the outlet side and over a portion of the inner tube, at least a portion of the middle tube positioned within the second and third holes;
    an outer tube having a diameter greater than the middle tube extending at least from the outlet side into the housing and over a portion of the middle tube, at least a portion of the outer tube positioned within the third hole;
    a first passageway through the housing extending from a first passageway opening of the housing to the second hole at the first position within the housing; and
    a second passageway through the housing extending from a second passageway opening of the housing to the third hole at the second position within the housing.

2. The microfluidic device of claim 1, wherein the inner and outer tubes are substantially cylindrical and the middle tube has a substantially square cross-section.

3. The microfluidic device of claim 1, wherein each tube is substantially cylindrical.

4. The microfluidic device of claim 1, wherein the housing is a substantially rigid block.

5. The microfluidic device of claim 4, wherein the block is a polymer.

6. The microfluidic device of claim 5, wherein the polymer is polyethylene.

7. The microfluidic device of claim 1, wherein the first and second passageways are tapered and luer locks are inserted for receiving tubes for applying fluid thereto.

8. The microfluidic device of claim 3, wherein the inner tube has an outer diameter of about 1 mm, the middle tube has an outer diameter of about 2 mm and the outer tube has an outer diameter of about 5 mm.

9. The microfluidic device of claim 1, wherein the middle tube extends about two thirds into the housing.

10. The microfluidic device of claim 1, wherein the outer tube extends about one-third into the housing.

11. A method of assembling a microfluidic device according to claim 1 for preparing encapsulation agents, comprising:
    providing a substantially rigid block having an inlet side and an outlet side;
    forming a first hole throughout the entire length of the block;
    forming a second hole from the outlet side of the block that is larger than the first hole and concentric to the first hole a distance from about 50 to about 85 percent of the distance of the block;
    forming a third hole from the outlet side of the block that is larger than the second hole and concentric to the first and second hole a distance from about 15 to about 50 percent of the distance of the block;
    inserting a first tube into the first hole extending from the inlet side to at least the outlet side;
    inserting a second tube into the second hole extending from the outlet side to a point short of the end of the second hole;
    inserting a third tube into the third hole extending from at least the outlet side to a point short of the end of the third hole; and
    forming channels in the block from the exterior to the region at the end of the second and third tubes.

12. The method of claim 11, including the step of inserting inner locks into the channels for attaching tubes thereto.

13. A method for preparing polymersomes, using a device according to claim 1, comprising:
    introducing an aqueous active ingredient into an inner capillary of a microfluidic device including multiple concentric coaxial capillary tubes;

introducing a block copolymer solution into a second capillary of the device surrounding the inner capillary in the same direction;
introducing an aqueous medium into an outer capillary of the device surrounding the second and first capillaries in the same direction;
withdrawing a resultant droplet surrounded by polymer solution from an outlet of the outer capillary; and
allowing polymersomes to self-assemble.

* * * * *